No. 761,879. PATENTED JUNE 7, 1904.
G. M. COSTELLO.
FIRE AND WATER PROOF FLEXIBLE TUBING.
APPLICATION FILED APR. 28, 1903.
NO MODEL.
Fig. 1.
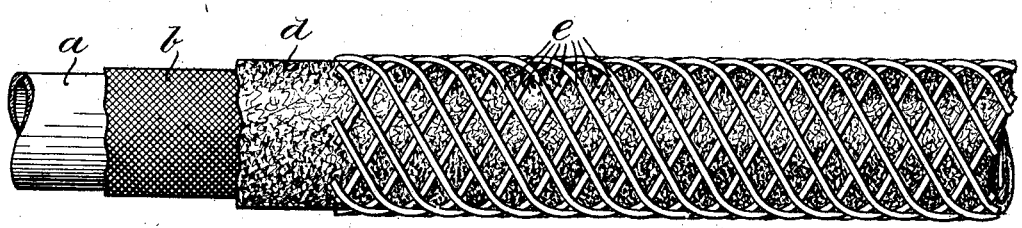
Fig. 2.  Fig. 3.
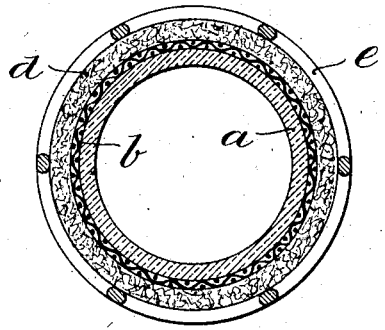 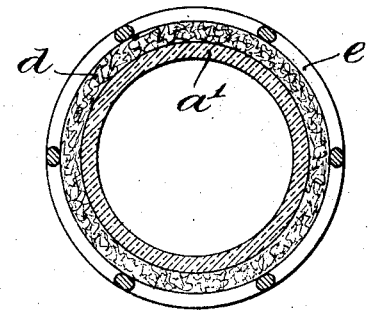
Witnesses:
Wilhelm Voigt
Thomas M. Smith
Inventor:
George M. Costello,
By J. Walter Douglas
Attorney No. 761,879. Patented June 7, 1904.

UNITED STATES PATENT OFFICE.

GEORGE M. COSTELLO, OF PHILADELPHIA, PENNSYLVANIA.

FIRE AND WATER PROOF FLEXIBLE TUBING.

SPECIFICATION forming part of Letters Patent No. 761,879, dated June 7, 1904.

Application filed April 28, 1903. Serial No. 154,724. (No model.)

*To all whom it may concern:*

Be it known that I, GEORGE M. COSTELLO, a citizen of the United States, residing at the city of Philadelphia, in the county of Philadelphia and State of Pennsylvania, have invented certain new and useful Improvements in Fire and Water Proof Flexible Tubing, of which the following is a specification.

My invention has relation to a flexible tubing adapted for use with riveting or similar tools; and in such connection it relates to the construction and arrangement of such a tubing when the same is both fluid-tight with respect to its interior and fireproof with respect to its exterior and yet of sufficient flexibility to permit of its efficient use.

In pneumatic tools, such as riveters or the like, the motive fluid is usually conveyed to the tool through a long flexible tubing, and heretofore the tubing in general use was the ordinary rubber hose. In use the rubber hose frequently came in contact with the hot metal, such as rivets, and was speedily burned through, and thereby rendered useless. Again, in dragging the hose and tool from place to place the abrasion of the hose thus occasioned speedily wore out the hose and rendered it useless.

The principal object of my invention is to provide a flexible tubing having on its exterior a porous matted covering of fireproof material, such as asbestos, and an armor of wire wound upon the porous fireproof covering to not only protect the covering from abrasion, but to also confine the covering to the exterior of the flexible tubing without impairing the flexibility of the composite tube.

The nature and scope of my invention will be more fully understood from the following description, taken in connection with the accompanying drawings, forming part hereof, in which—

Figure 1 is a side elevational view, partly broken away, of a tubing embodying main features of my present invention. Fig. 2 is a cross-sectional view, enlarged, of said tubing; and Fig. 3 is a view similar to Fig. 2, but illustrating a modified form of the invention.

Referring to the drawings, *a* represents an interior tube of rubber or other somewhat similar flexible material. In the form illustrated in Figs. 1 and 2 this tube *a* is incased in a woven fabric *b*, of canvas, linen, or other suitable material. On the exterior of the fabric *b* and tube *a* is arranged a covering *d*, of loosely-matted asbestos or similar fibrous material, and around the covering *d*, of asbestos, are wound the wires *e*, preferably in opposite spirals. In Fig. 3 the covering *d*, of asbestos, is placed around an inner air and fluid proof tube *a'*, of rubber and other flexible material, and is confined thereon by the wires *e*, as in Figs. 1 and 2, but without the canvas or similar covering for the tube *a*, as the latter is made air and fluid proof. The armor, consisting of the wires *e*, is so constructed as not to seriously impair the flexibility of the tube and has at least two functions—namely, the armor *e* serves to confine the loosely-matted covering *d* to the inner flexible tube, and it also serves to protect said covering from abrasion as the tubing is dragged from place to place. By winding the wires *e* in opposite spirals the covering *d* is efficiently confined to the flexible inner tube and yet the composite tube may be turned or bent without breaking or otherwise impairing the covering *d*, the wires *e* sliding readily upon said covering *d*.

The composite tube produced as hereinbefore described is flexible, fluid-proof in its interior, and fireproof on its exterior. The covering *d* being of loosely-matted fireproof material is sufficiently porous to efficiently insulate the rubber inner tube from the heat of hot rivets, &c., when the tubing is in use.

Having thus described the nature and object of my invention, what I claim as new, and desire to secure by Letters Patent, is—

1. A fire and water proof hose, comprising a flexible tube having on the exterior a porous matted covering of fireproof material and an armor of wire wound upon the porous fireproof covering to not only protect said covering from abrasion but to also confine the covering to the exterior of said flexible tube without impairing the flexibility of the hose, substantially as and for the purposes set forth.

2. A fire and water proof hose, comprising a flexible tube of composite material having a surrounding covering of loosely-matted asbestos and an armor of wire wound upon the loosely-matted asbestos covering to not only protect said covering from abrasion, but to also confine the covering to the exterior of said flexible composite tube without impairing the flexibility of the hose, substantially as and for the purposes described.

In testimony whereof I have hereunto set my signature in the presence of two subscribing witnesses.

GEORGE M. COSTELLO.

Witnesses:
J. WALTER DOUGLASS,
THOMAS M. SMITH.